(12) United States Patent
Ramsburg et al.

(10) Patent No.: US 11,090,702 B2
(45) Date of Patent: Aug. 17, 2021

(54) COMPOSITIONS AND METHODS FOR DELIVERY OF ACTIVE AGENTS

(71) Applicant: TRUSTEES OF TUFTS COLLEGE, Medford, MA (US)

(72) Inventors: C. Andrew Ramsburg, Reading, MA (US); Christopher S. Martin, Somerville, MA (US); Katherine A. Muller, Somerville, MA (US)

(73) Assignee: TRUSTEES OF TUFTS COLLEGE, Medford, MA (US)

(*) Notice: Subject to any disclaimer, the term of this patent is extended or adjusted under 35 U.S.C. 154(b) by 0 days.

(21) Appl. No.: 16/313,812

(22) PCT Filed: Jun. 28, 2017

(86) PCT No.: PCT/US2017/039663
§ 371 (c)(1),
(2) Date: Dec. 27, 2018

(87) PCT Pub. No.: WO2018/005600
PCT Pub. Date: Jan. 4, 2018

(65) Prior Publication Data
US 2019/0169374 A1 Jun. 6, 2019

Related U.S. Application Data

(60) Provisional application No. 62/355,556, filed on Jun. 28, 2016.

(51) Int. Cl.
*B09C 1/00* (2006.01)
*B09C 1/08* (2006.01)
(Continued)

(52) U.S. Cl.
CPC ............ *B09C 1/00* (2013.01); *B09C 1/002* (2013.01); *B09C 1/08* (2013.01); *B01J 13/14* (2013.01);
(Continued)

(58) Field of Classification Search
CPC ............. B09C 1/00; B09C 1/002; B09C 1/08
See application file for complete search history.

(56) References Cited

U.S. PATENT DOCUMENTS 3,660,563 A * 5/1972 Gould et al. ............ A01N 25/10
514/772.1
4,624,848 A * 11/1986 Lee ...................... A61K 9/2027
424/486
(Continued)

FOREIGN PATENT DOCUMENTS

EP 0164311 B1 3/1991
JP 07-275688 A 10/1995
(Continued)

OTHER PUBLICATIONS

Cardenas et al., "Microbial communities in contaminated sediments, associated with bioremediation of uranium to submicromolar levels" Appl Environ Microbiol. Jun. 2008;74(12):3718-29.
(Continued)

*Primary Examiner* — Janine M Kreck
(74) *Attorney, Agent, or Firm* — Casimir Jones, S.C.; Tanya A. Arenson

(57) ABSTRACT

The present disclosure relates to remediation of contaminated environmental sites. In particular, the present disclosure relates to passive control compositions and their use in remediation.

12 Claims, 4 Drawing Sheets

(51) Int. Cl.
*B01J 13/14* (2006.01)
*B01J 13/20* (2006.01)
*C08J 3/075* (2006.01)

(52) U.S. Cl.
CPC ........... *B01J 13/20* (2013.01); *B09C 2101/00* (2013.01); *C08J 3/075* (2013.01); *C08J 2301/28* (2013.01); *C08J 2305/04* (2013.01); *C08J 2305/08* (2013.01); *C08J 2333/26* (2013.01)

(56) References Cited

U.S. PATENT DOCUMENTS

| | | | | |
|---|---|---|---|---|
| 5,618,329 | A * | 4/1997 | Drake | B09C 1/10 71/6 |
| 7,963,720 | B2 * | 6/2011 | Hoag | B09C 1/002 405/128.75 |
| 8,519,061 | B2 * | 8/2013 | Luster-Teasley | B09C 1/08 210/757 |
| 8,563,649 | B2 * | 10/2013 | Edmiston | B09C 1/08 524/588 |
| 2005/0077242 | A1 * | 4/2005 | Karlsson | B09C 1/002 210/638 |
| 2010/0068290 | A1 | 3/2010 | Ziegler et al. | |
| 2011/0195875 | A1 * | 8/2011 | Swearingen | B09C 1/002 507/214 |
| 2016/0045841 | A1 * | 2/2016 | Kaplan | C01B 32/21 429/49 |
| 2017/0027168 | A1 * | 2/2017 | Heath | A01N 25/30 |

FOREIGN PATENT DOCUMENTS

| | | |
|---|---|---|
| WO | WO2010062261 A1 | 6/2010 |
| WO | WO2013119183 A1 | 2/2013 |
| WO | WO2018005600 A1 | 1/2018 |

OTHER PUBLICATIONS

Fedorockova et al., "Effects of pH and acid anions on the dissolution kinetics of MgO." Chemical Engineering Journal 143.1-3 (2008): 265-272.

Furman et al., "Mechanism of base activation of persulfate" Environ Sci Technol. Aug. 15, 2010;44(16):6423-8.

Istok et al., "In situ bioreduction of technetium and uranium in a nitrate-contaminated aquifer" Environ Sci Technol. Jan. 15, 2004;38(2):468-75.

Komlos et al., "Long-term dynamics of uranium reduction/reoxidation under low sulfate conditions." Geochimica et Cosmochimica Acta 72.15 (2008): 3603-3615.

Krupka et al., Geochemical Factors Affecting the Behavior of Antimony, Cobalt, Europium, Technetium, and Uranium in Vadose Zone Sediments. No. PNNL-14126. Pacific Northwest National Lab.(PNNL), Richland, WA (United States), 2002.

Lovley et al., "Dissimilatory metal reduction" Annu Rev Microbiol. 1993;47:263-90.

Michalsen et al., "Changes in microbial community composition and geochemistry during uranium and technetium bioimmobilization" Appl Environ Microbiol. Sep. 2007;73(18):5885-96.

Michalsen et al., "Uranium and technetium bio-immobilization in intermediate-scale physical models of an in situ bio-barrier" Environ Sci Technol. Nov. 15, 2006;40(22):7048-53.

Nevin et al., "Microorganisms associated with uranium bioremediation in a high-salinity subsurface sediment" Appl Environ Microbiol. Jun. 2003;69(6):3672-5.

Thomas et al., "Diversity and distribution of anaeromyxobacter strains in a uranium-contaminated subsurface environment with a nonuniform groundwater flow" Appl Environ Microbiol. Jun. 2009;75(11):3679-87.

Vrionis et al., "Microbiological and geochemical heterogeneity in an in situ uranium bioremediation field site" Appl Environ Microbiol. Oct. 2005;71(10):6308-18.

Wan et al., "Reoxidation of bioreduced uranium under reducing conditions" Environ Sci Technol. Aug. 15, 2005;39(16):6162-9.

Warren et al. "Kinetics and mechanism of reductive dehalogenation of carbon tetrachloride using zero-valence metals." Journal of Hazardous Materials 41.2-3 (1995): 217-227.

Wei et al., "Catalytic hydrodechlorination of 2,4-dichlorophenol over nanoscale Pd/Fe: reaction pathway and some experimental parameters" Water Res. Jan. 2006;40(2):348-54.

Wu et al., "Pilot-scale in situ bioremedation of uranium in a highly contaminated aquifer. 2. Reduction of u(VI) and geochemical control of u(VI) bioavailability" Environ Sci Technol. Jun. 15, 2006;40(12):3986-95.

Wu et al., "Pilot-scale in situ bioremediation of uranium in a highly contaminated aquifer. 1. Conditioning of a treatment zone" Environ Sci Technol. Jun. 15, 2006;40(12):3978-85.

Zhong et al., "Uranium immobilization by hydrogen sulfide gaseous treatment under vadose zone conditions." Vadose Zone Journal 6.1 (2007): 149-157.

International Search Report of related PCT/US2017/039663 dated Oct. 13, 2017, 12 pages.

* cited by examiner

COMPOSITIONS AND METHODS FOR DELIVERY OF ACTIVE AGENTS

This application is a U.S. 371 national phase entry of International Patent Application No. PCT/US2017/039663, filed Jun. 28, 2017, which claims priority to Provisional Patent Application Ser. No. 62/355,556, filed Jun. 28, 2016, which are herein incorporated by reference in their entireties.

STATEMENT REGARDING FEDERALLY SPONSORED RESEARCH OR DEVELOPMENT

This invention was made with government support under 10000714 awarded by the National Science Foundation. The government has certain rights in the invention.

FIELD OF THE DISCLOSURE

The present disclosure relates to remediation of contaminated environmental sites. In particular, the present disclosure relates to passive control compositions and their use in remediation.

BACKGROUND OF THE DISCLOSURE

Remediation technologies often presume there will be advances in amendment delivery and release that will increase treatment efficacy, and thereby the probability that cleanup efforts will result in site closure. In fact, poor amendment delivery, mixing, and release are typically cited when a remediation technology performance is substandard. Thus, there is a strong need for devices and techniques that can effectively alter subsurface conditions to foster specific remediation processes. Moreover, there is substantial preference for adjustments which are passively controlled (e.g., infrequent site visits by personnel designing and conducting the remediation effort).

The current state of the practice related to pH adjustments to offset acid production during treatment is alkalinity addition in the form of aqueous solutions of NaOH or the like. There are some products such as emulsified oil products that contain $Mg(OH)_2$ or $CaCO_3$, but the solids in these are generally colloidal size (>1 µm) and unprotected. Thus, there is no control on the rate of alkalinity addition beyond dosing the colloid material.

Additional methods are needed in remediation of contaminated zones.

SUMMARY OF THE DISCLOSURE

The present disclosure relates to remediation of contaminated environmental sites. In particular, the present disclosure relates to passive control compositions and their use in remediation.

For example, in some embodiments, the present disclosure provides a composition, comprising: an inactive (e.g., dehydrated or in a colloidal suspension) hydrogel with a core of an active agent surrounded by a polymer shell, wherein the polymer swells and releases said agent in response to a change in environment (e.g., pH, temperature, or oxidation state). In some embodiments, the polymer is, for example, chitosan, carboxymethylcellulose, alginate, polyacrylamide, or carrageenan. In some embodiments, the polymer is cross-linked (e.g., with glutaraldehyde, formaldehyde, or genipin). The present disclosure is not limited to a particular active agent. Examples include, but are not limited to, calcium carbonate, magnesium oxide, or citric acid. In some embodiments, the active agent is a micron sized particle, droplet, or nanoparticle. In some embodiments, the release of the agent alters the pH of the environment.

Further embodiments provide a method of remediating an environmental site, comprising: introducing a composition described herein an environmental site undergoing remediation under conditions such that the release of the active agent from the hydrogel is enhanced within a defined pH range. In some embodiments, the active agent alters the pH of the environmental site. In some embodiments, the defined pH range is determined by the polymer and crosslinking agent. In some embodiments, the environmental site is a groundwater contamination site, surface water body, or a mine. In some embodiments, the site is contaminated with a contaminant selected from, for example, a chlorinated solvent, a radionuclide, an actinide, or an organic contaminant. In some embodiments, the environmental site is undergoing engineered or natural reactions supporting in situ chemical oxidation, abiotic reduction, or in situ dechlorination.

Additional embodiments will be apparent to persons skilled in the relevant art based on the teachings contained herein.

DEFINITIONS

To facilitate an understanding of the present disclosure, a number of terms and phrases are defined below:

As used herein, the term "environmental contaminant" refers to any compound not naturally found in a given environment (e.g., harmful to the environment or animals (e.g., humans)). In some embodiments, environmental contaminants are found in NAPLs. In some embodiments, environmental contaminants are solvents or industrial byproducts (e.g., including but not limited to, halogenated methanes, ethanes, ethenes and benzenes (e.g. carbon tetrachloride, chloroform, trichloroethene, trichloroethane modified benzenes)). In some embodiments, the environmental contaminant is trichloroethene.

As used herein, the term "neutralizing environmental contaminants" refers to the process of altering environmental contaminants to result in products that are no longer harmful to the environment or animals (e.g., humans). In some embodiments, the process of neutralizing environmental contaminants includes dechlorination (e.g., by using compositions described herein).

As used herein, the term "defined pH range" refers to the pH range over which compounds described herein (e.g., cross-linked hydrogels) dissolve and release active agents encapsulated therein. In some embodiments, compounds are in a liquid (e.g., environmental site) and after release, the active agents alter the pH of the site.

DETAILED DESCRIPTION OF THE DISCLOSURE

The present disclosure relates to remediation of contaminated environmental sites. In particular, the present disclosure relates to passive control compositions and their use in remediation.

Provided herein are pH responsive carriers that are improved in concept and application. First, the carriers are designed to moderate the rate of alkalinity release as the pH increases. That is, they impart control to the release. Second, the gels protect the mineral particles. That is, even in the swollen state the rate of alkalinity release is slower and more suitable for application. Third, in some embodiments, hydrogels are provided as coatings on nanoparticles. In some embodiments, hydrogels are micron sized particles or droplets. Fourth, a suspension of these hydrogel carriers is applied to the zone of the subsurface being treated. The carriers are retained with the porous medium and release their contents over time depending on the prevailing local chemical conditions. This is in contrast to aqueous additions that flow through (and then out of) the treatment zone.

Figure 1:
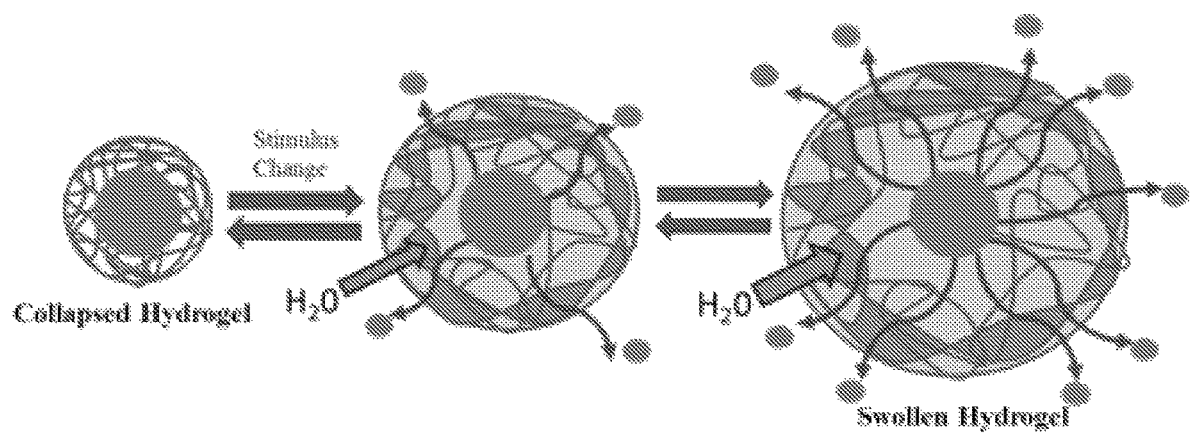
FIG. 1 shows a conceptualization of swelling of a hydrogel in response to a change in pH.

Described herein is a carrier for chemical additives used to remediate contaminated subsurface environment, along with other uses. In some embodiments, this carrier contains elements of passive control so that the rate of release of the chemical amendment is controlled by the prevailing chemical conditions surrounding the carrier. In some embodiments, the carriers are hydrogels—crosslinked polyelectrolytes. In some embodiments, pH is controlled through the release of alkalinity (specifically in the form of $Mg(OH)_2$ that dissolves to release $Mg^{2+}$ and $OH^-$. This type of system is applicable to cleanup scenarios where pH decreases during the course of treatment (e.g., reductive dechlorination of chlorinated solvents where the decontamination produces a strong acid, HCl). In this system, hydrogel swells at low pH. Embedded within the hydrogel carriers are solid MgO nanoparticles (10-300 nm). As the hydrogel swells more MgO can dissolve (see conceptual diagram presented as FIG. 1). As more MgO dissolves more OH— is released.

Experiments described herein provide data showing hydrogel swelling as a function of crosslinking. These gels are made from chitosan and glutaraldehyde and are suitable for introduction within the subsurface environment.

Accordingly, provided herein are hydrogels for controlled release of active agents (e.g., in bioremediation). The present disclosure is not limited to particular components of the carrier. In some embodiments, the carrier is a polymer that releases the active agent based on changes in environmental conditions. Examples include, but are not limited to, chitosan, carboxymethylcellulose, alginate, polyacrylamide, or carrageenan.

In some embodiments, polymers are cross-linked. Exemplary cross-linking agents include but are not limited to, glutaraldehyde, formaldehyde, or genipin.

The present disclosure is not limited to particular active agents. Examples include, but are not limited to, calcium carbonate, magnesium oxide, or citric acid.

In some embodiments, the compositions described herein find use in ground water remediation. In addition, remediation of acid mine drainage also relies heavily on the addition of alkalinity, typically in the form of $CaCO_3$, which causes many of the toxic metals present in acid mine drainage to precipitate (Johnson et. al, Science of The Total Environment Volume 338, Issues 1-2, 1 Feb. 2005, Pages 3-14; Rios et al., J Hazard Mater. 2008; 156(1-3):23-35). Thus, in some embodiments, compounds and methods described herein further find use in mine drainage remediation. Exemplary applications where control of pH using the described compositions and methods finds use are described below. Other uses are specifically contemplated.

Compounds to adjust pH are among the most common and often most important amendments added to groundwater during site remediation. Frequently the overall success of strategies aiming to transform or sequester organic and inorganic contaminants relies on effective and sustained pH control. The compositions and methods described herein find use in a variety of subsurface remediation where controlled release of pH adjusting compounds is desired. Examples include, but are not limited to, transformation of chlorinated compounds, in situ stabilization of radionuclides and/or actinides, and base activation of strong oxidants used to detoxify contaminated sites.

The need for pH control during the in situ dechlorination of chlorinated solvents is well known. Most frequently, pH control is used for bioremediation, though sensitivity to pH has been demonstrated for abiotic reductive dechlorination of solvents using zero-valent iron (Warren et al., 1995 Journal of Hazardous Materials 41, 217-227, Wei et al., 2006 Water Research 40, 348-354). Within the context of bioremediation, chlorinated solvents may be degraded by microbial communities through direct or co-metabolic reductive dechlorination. In the subsurface, reductive dechlorination can be enhanced using a combination of bioaugmentation with microorganisms known to degrade contaminants of concern and injection of substrates to stimulate microbial growth. The effectiveness of in-situ bioremediation depends significantly upon groundwater chemistry. In order for reductive dechlorination to proceed at an optimal rate, the environment in the subsurface should be conducive to cell growth and metabolism, typically with an optimal pH range between 6 and 8. The production of hydrochloric acid during dechlorination and the production of organic acids from fermentation of substrates can cause the pH of groundwater to decrease, and low pH is frequently cited as a reason for slow or incomplete dechlorination. The need for pH control is particularly pronounced in non-aqueous phase liquid (NAPL) source zones where acid production may exceed the buffer capacity of even a well-buffered soil.

Radionuclide or actinide contamination can be difficult and costly to address, particularly where co-mingled with acidic nitrate and industrial solvent plumes. Uranium (U) and technetium (Tc) are frequently among the contaminants of concern. Both U and Tc are long-lived radionuclides that are frequently mobile within oxidative subsurface environments (Krupka and Serne, 2002). However, reduced forms of U and Tc (e.g., U(IV) and Tc (IV)) tend to form relatively insoluble minerals (Krupka and Serne, 2002 Pacific Northwest National Laboratory, Publication PNNL-14126). Observations that several organisms can use U(VI) and Tc(VII) as electron acceptors (e.g., Lovley, 1993 Annu. Rev. Microbiol., 47(1): 263-290; Nevin et al., 2003 Appl. Environ. Microbiol., 69(6):3672-3675; Michalsen et al., 2007 Appl. Environ. Microbiol., 73(18): 5885-5896; Cardenas et al., 2008 Appl. Environ. Microbiol., 74(12): 3718-3729; Thomas et al., 2009 Appl. Environ. Microbiol., 75(11): 3679-3687), coupled with the decreased mobility of these contaminants when reduced, makes bio-based treatments attractive. Several techniques for bioreduction have been studied at the pilot- or field-scale (e.g., Istok et al., 2004 Environ. Sci. Technol., 38(2): 468-475; Vrionis et al., 2005 Appl. Environ. Microbiol., 71(10): 6308-6318; Michalsen et al., 2006 Environ. Sci. Technol., 40(22): 7048-7053; Wu et al., 2006 Environ. Sci. Technol., 40(12): 3978-3985; Wu et al., 2006 Environ. Sci. Technol., 40(12): 3986-3995). More recently, however, studies have demonstrated that both U(IV) and Tc(IV) may be re-oxidized to mobile species as geochemical conditions change (e.g., Wan et al., 2005 Environ. Sci. Technol., 39(16):6162-6169; Komlos et al. 2008 Geochim. Cosmochim. Ac., 72: 3603-3615; Morris et al., 2008). These results have prompted some researchers to pursue abiotic reduction strategies where control of mineral formation may provide kinetic stability against re-oxidation (e.g., Zhong et al., 2007 Vadose Zone J., 6: 149-157; Tratnyek et al., 2009 US DOE, Office of Biological and Environmental Research, 08-09 University Award Abstracts). An important aspect of both abiotic and biotic based reduction scenarios is their reliance upon manipulation of the subsurface environment through the introduction of remedial amendments. Those amendments include fermentable substrate, strong reductants and chemicals to control pH.

In situ chemical oxidation (ISCO) is a common treatment for a range of organic contaminants present in the subsurface. ISCO describes the process, but there are several chemistries used to create and maintain the strong oxidant. One of these chemistries is involves activating persulfate using basic conditions (there are other methods of activation) (e.g., Furman et al. 2010 Env. Sci. Technol; 44 (16): 6423-6428). Base-activation requires the pH in the treatment zone to be elevated (pH 10-12) during remediation and then decreased back to pre-treatment conditions following remediation (pH 5-7 is common). Controlled release of pH adjusting compounds aids in both cases.

EXAMPLES

The following examples are provided in order to demonstrate and further illustrate certain preferred embodiments and aspects of the present disclosure and are not to be construed as limiting the scope thereof.

Example 1

Materials

Low molecular-weight chitosan with a degree of deacetylation of 75% to 85% and aqueous glutaraldehyde solution (25% by weight) were obtained from Sigma-Aldrich. Magnesium oxide particles used were smaller than 325 mesh (44 microns).

1. Hydrogel Swelling Experiments

Hydrogel Preparation

Chitosan hydrogels were prepared using a procedure similar to Guan et al. (1996). A chitosan solution with a concentration of 3% chitosan by weight was prepared by dissolving chitosan in 0.25 N acetic acid, producing a viscous, pale-yellow solution. Glutaraldehyde stock solution was diluted with de-ionized water to a concentration of 0.5%. Hydrogels were prepared by adding varying amounts of glutaraldehyde solution to the chitosan solution and stirring vigorously at 60° C. for 60 seconds. The relative amount of glutaraldehyde added ranged from 0 to 0.013 g glutaraldehyde per g chitosan. The solution was then poured into a 9-cm glass plate and held at 45° C. until the solvent was completely evaporated. Dry hydrogels were removed from the glass plate and stored in a desiccator until use.

Swelling Experiments

Buffer solutions were prepared to evaluate the swelling properties of chitosan hydrogels at four different values of pH. Buffers were selected to cover a broad range of pH including pH 1.75 (hydrochloric acid, sodium chloride); pH 4.5, 5.1, 5.7, and 6.3 (acetic acid, sodium acetate); pH 6.9 (monobasic sodium phosphate, dibasic sodium phosphate); and pH 9.7 (sodium bicarbonate, sodium carbonate). All buffers were prepared with an ionic strength of 0.1M.

Swelling experiments were conducted by weighing a piece dry hydrogel and placing the hydrogel in a buffer solution for a period of approximately 4 hours. Upon removal, excess water was blotted from the surface of the hydrogel, and the hydrated weight was measured. Swelling ratio was calculated according to the following formula:

$$S = \frac{W_h - W_d}{W_d}$$

where $W_d$ is the dry hydrogel weight and $W_h$ is the weight after swelling. Three experiments were conducted for each buffer/hydrogel combination.

Results

Figure 2:
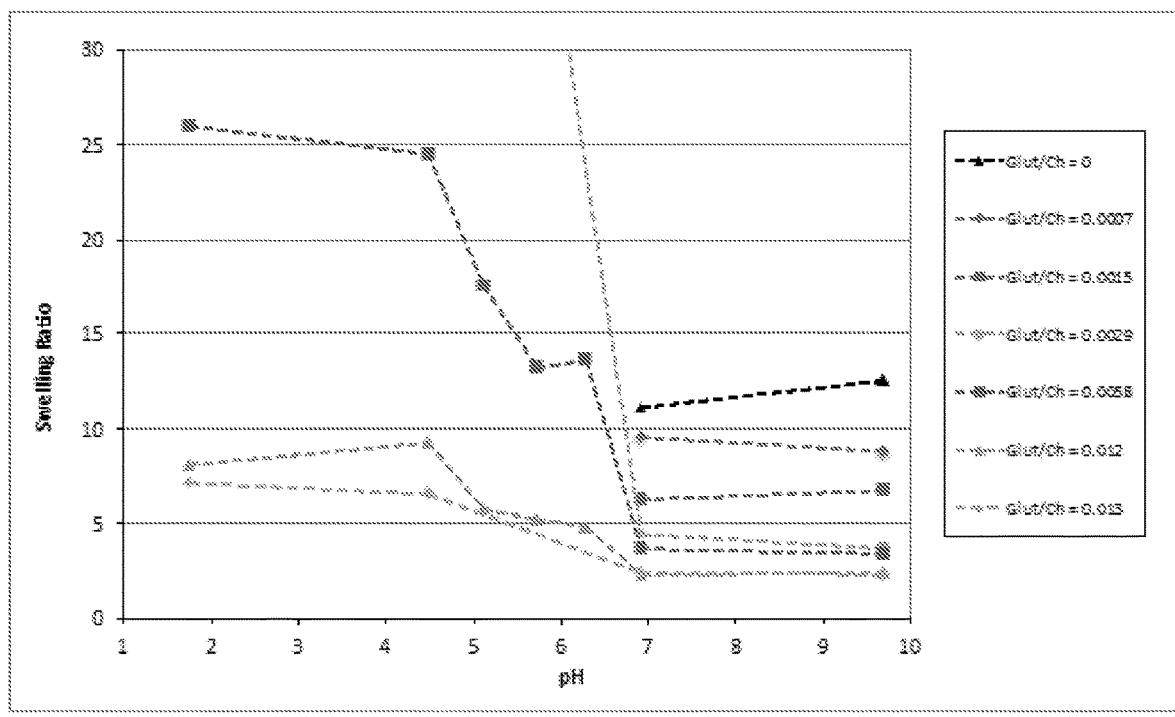
FIG. 2 shows swelling ratios of chitosan hydrogels in buffer solutions at various pH. Swelling ratios are presented for glutaraldehyde/chitosan ratios ranging from 0 to 0.013 g/g.

The average swelling ratio for each hydrogel in each buffer solution is presented in FIG. 2. Observed swelling ratios ranged from 2.3 to greater than 30. All hydrogels exhibited a higher swelling ratio under acidic conditions than under neutral or alkaline conditions. Swelling ratios are highly dependent upon the degree of cross-linking, particularly at low pH. The hydrogels with glutaraldehyde/chitosan ratios of 0, 0.0007, and 0.0015 g/g disintegrated at low pH, preventing measurement of hydrated weight. Generally, for hydrogels with a higher degree of cross-linking, a lower swelling ratio was observed over the entire range of pH investigated. The transition between a swollen state and a contracted state occurred between pH 4.5 and pH 6.9.

2. Alkalinity Release

Preparation of Hydrogel Loaded with MgO Particles

A 3% chitosan solution in 0.25 N acetic acid was prepared as described above. Glutaraldehyde was added to a volume of chitosan solution to obtain a ratio of 0.013 g/g, and the mixture was stirred vigorously for 60 seconds. A suspension of magnesium oxide particles in water was then added to the chitosan solution and mixed with sonication for 5 seconds, at which point an opaque, white gel formed. The gel was cut into several pieces and allowed to dry; the dried hydrogels were subsequently stored in a desiccator until use.

Alkalinity Release Experiments

Several pieces of MgO-impregnated chitosan were suspended in 100 mL of deionized water under a nitrogen headspace. The reactor was continuously stirred using a magnetic stirrer, and pH was recorded every 3 seconds. The dry gels were allowed to hydrate for 4 hours. Subsequently, 2.5 mL of 0.1 M hydrochloric acid was added to the container in order to decrease the pH and observe the alkalinity release behavior of the MgO-impregnated chitosan.

Results

Figure 3:
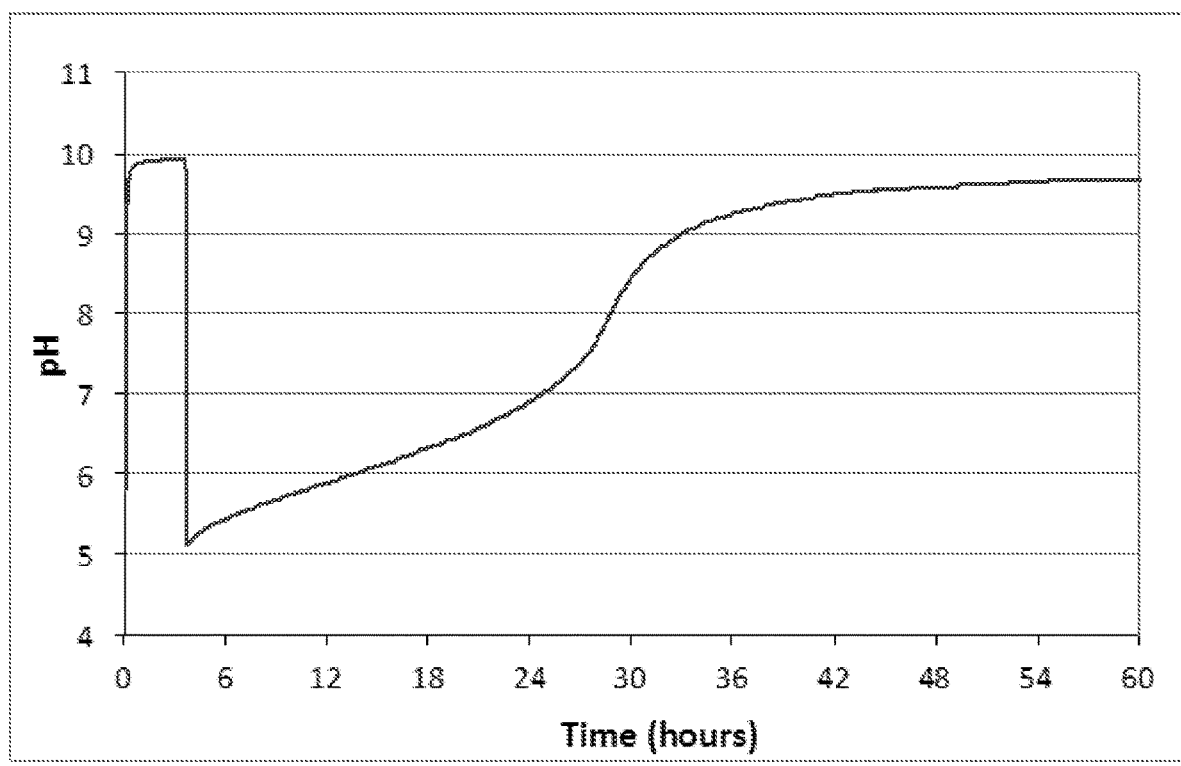
FIG. 3 shows change in pH due to release of alkalinity from MgO-impregnated chitosan hydrogel.

The pH measured in the stirred reactor is presented in FIG. 3. Prior to addition of HCl, the pH in the reactor was approximately 10. The addition of HCl to the reactor quickly decreased the pH to 5.1. The pH then increased as the MgO particles were dissolved. Encasing MgO particles in cross-linked chitosan has the effect of attenuating the rate at which particle dissolution occurs, resulting in the pH increasing more slowly than if MgO particles were in direct contact with the water.

Figure 4:
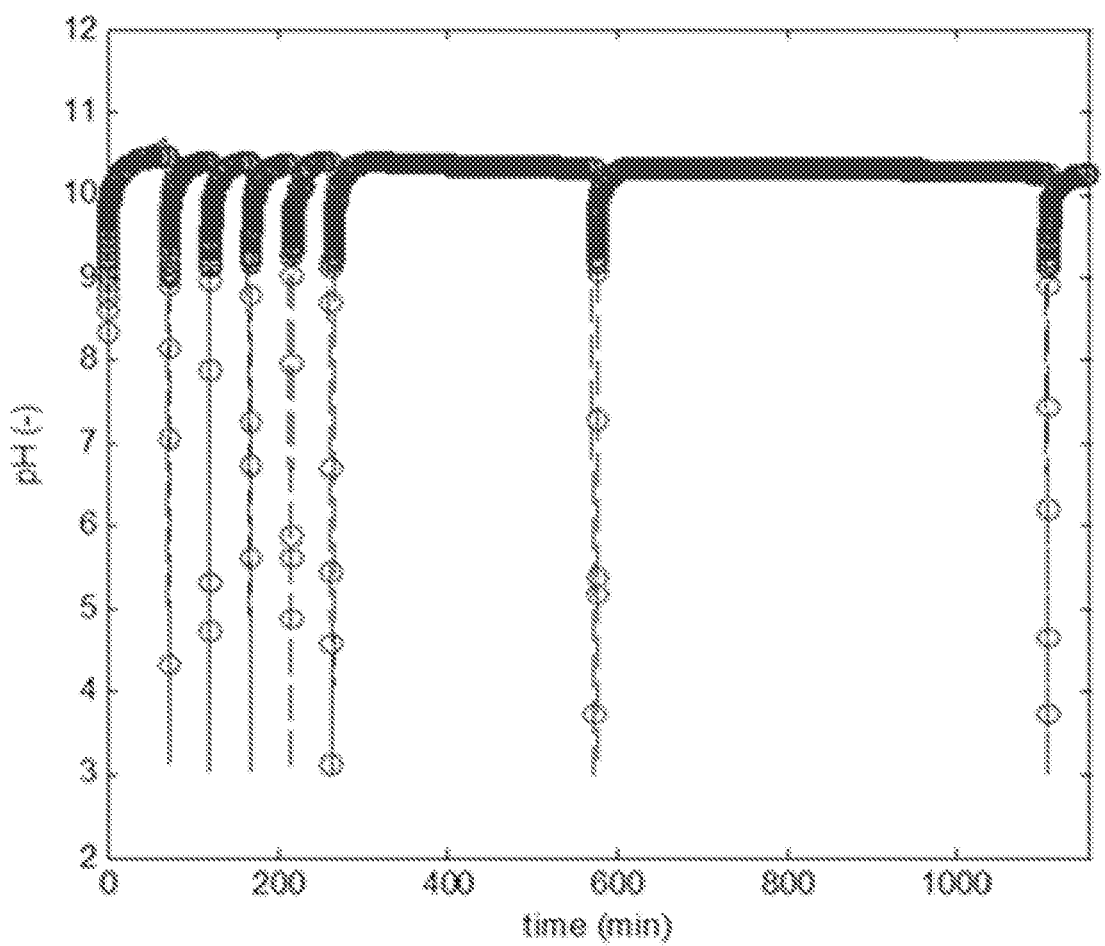
FIG. 4 shows release kinetics from bare MgO particles (100 nm).

Shown in FIG. 4 are release kinetics for bare particles in experiments conducted in a similar manner as those conducted with the particle impregnated hydrogels. These kinetics are well described by an empirical model developed by Fedoročková and Raschman (2008 Chemical Engineering Journal 143, 265-272) which is shown as the solid line in FIG. 4. The conclusion is that upon acid addition the bare particles quickly dissolve and re-establish the equilibrium pH (~10). In the presence of the hydrogel this release rate is substantially moderated providing longer durations within the optimal treatment range (6<pH<8).

All publications and patents mentioned in the above specification are herein incorporated by reference. Various modifications and variations of the described method and system of the disclosure will be apparent to those skilled in the art without departing from the scope and spirit of the disclosure. Although the disclosure has been described in connection with specific preferred embodiments, it should be understood that the disclosure as claimed should not be unduly limited to such specific embodiments. Indeed, various modifications of the described modes for carrying out the disclosure that are obvious to those skilled in environmental remediation or related fields are intended to be within the scope of the following claims.

We claim:

1. A method of remediating an environmental site, comprising:
   introducing a composition comprising an inactive hydrogel with a core of an active agent surrounded by a polymer shell, wherein said polymer shell swells and releases said agent in response to a change in pH, to an environmental site undergoing remediation under conditions such that said composition releases said active agent only within a defined pH range.

2. The method of claim 1, wherein said polymer is selected from the group consisting of chitosan, carboxymethylcellulose, alginate, polyacrylamide, and carrageenan.

3. The method of claim 1, wherein said polymer is cross-linked.

4. The method of claim 3, wherein said polymer is cross-linked with a cross-linking agent selected from the group consisting of glutaraldehyde, formaldehyde, and genipin.

5. The method of claim 1, wherein said active agent is selected from the group consisting of calcium carbonate, magnesium oxide, and citric acid.

6. The method of claim 1, wherein said active agent is a nanoparticle, a micron sized particle, or a droplet.

7. The method of claim 1, wherein release of said agent alters the pH of said environment.

8. The method of claim 1, wherein said inactive hydrogel is dehydrated or in a colloidal suspension.

9. The method of claim 1, wherein said defined pH range is determined by the polymer and crosslinking agent.

10. The method of claim 1, wherein said environmental site is a groundwater contamination site, surface water body, or a mine.

11. The method of claim 1, wherein said site is contaminated with a contaminant selected from the group consisting of a chlorinated solvent, a radionuclide, an actinide, and an organic contaminant.

12. The method of claim 1, wherein said environmental site is undergoing a rededication reaction selected from the group consisting of in situ chemical oxidation, abiotic reduction, and in situ dechlorination.

* * * * *